United States Patent
Masas

(10) Patent No.: US 6,669,158 B2
(45) Date of Patent: Dec. 30, 2003

(54) METHODS AND APPARATUS FOR SUSPENDING FIXTURES

(76) Inventor: Fernando R. Masas, 100 Astoria Ave., Bridgeport, CT (US) 06604

(*) Notice: Subject to any disclaimer, the term of this patent is extended or adjusted under 35 U.S.C. 154(b) by 0 days.

(21) Appl. No.: 10/134,229

(22) Filed: Apr. 26, 2002

(65) Prior Publication Data

US 2003/0201373 A1 Oct. 30, 2003

(51) Int. Cl.⁷ ................................................ A47H 1/10
(52) U.S. Cl. .................... 248/317; 248/547; 248/216.1; 411/441; 411/515
(58) Field of Search ................................ 248/317, 547, 248/216.1; 411/147, 156, 542, 960, 441, 513, 514, 515; 52/506.06, 506.05, 704, 712; 409/403

(56) References Cited

U.S. PATENT DOCUMENTS

| | | | |
|---|---|---|---|
| 3,415,473 A | * 12/1968 | Ollen | |
| 3,870,428 A | * 3/1975 | Jackson | 404/134 |
| 3,911,638 A | * 10/1975 | Englund et al. | 52/489 |
| 3,995,823 A | * 12/1976 | Hensel | 248/327 |
| 5,110,247 A | * 5/1992 | Losada | 411/441 |
| 5,758,465 A | * 6/1998 | Logue | 52/506.06 |
| 5,788,444 A | * 8/1998 | Losada | 411/441 |

FOREIGN PATENT DOCUMENTS

AU Derwent 1995-328565 * 2/1994

* cited by examiner

Primary Examiner—Gwendolyn Baxter
(74) Attorney, Agent, or Firm—Thomas A. Gallagher

(57) ABSTRACT

The apparatus of the invention includes an angle bracket with a hole for a fastener and a flange with a hole for coupling a wire to the angle bracket. The flange is arranged to be substantially perpendicular to the axis of the fastener and substantially perpendicular to the axis of the wire. Six embodiments of a bracket according to the invention are disclosed. According to the invention a wire is provided with a deformation or attachment at one end which prevents it from passing completely through the hole in the flange of the bracket. Eight embodiments of a wire according to the invention are disclosed. The wires of the invention may be used with some prior art brackets with little or no modification to the bracket. An unmodified prior art bracket is shown in conjunction with wires according to the invention and a slightly modified prior art bracket is shown with a wire according to the invention.

18 Claims, 17 Drawing Sheets

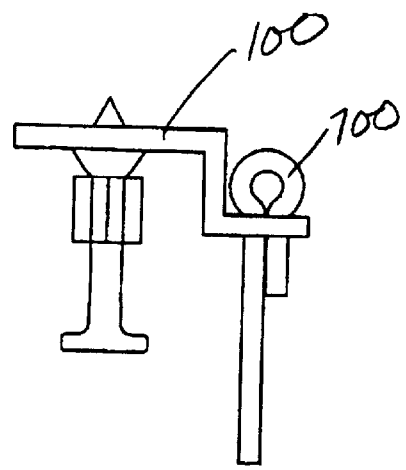
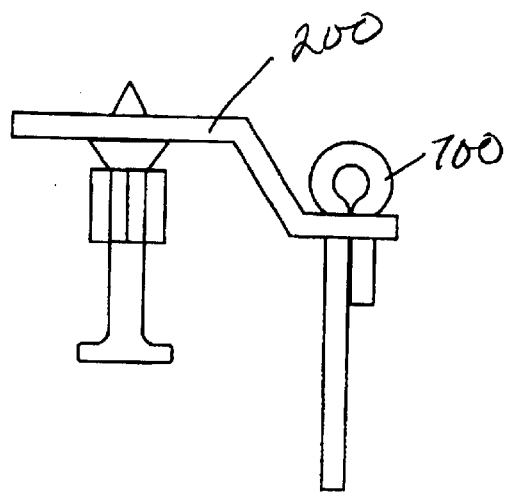
FIG. 26
FIG. 27
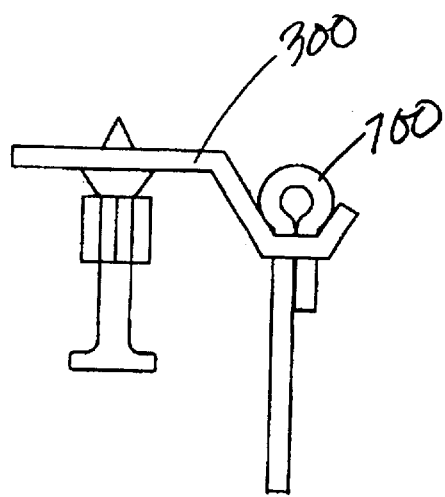
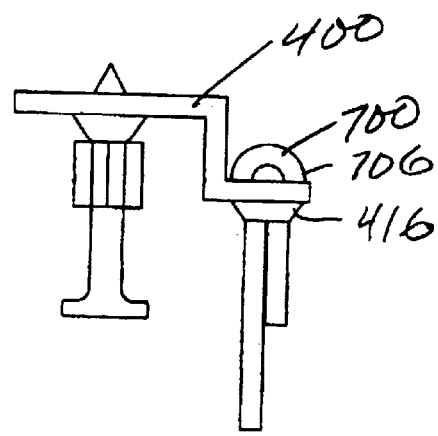
FIG. 28
FIG. 29

METHODS AND APPARATUS FOR SUSPENDING FIXTURES

This application is related to my prior application Ser. No. 10/092,741 filed Mar. 7, 2002, the complete disclosure of which is hereby incorporated by reference herein.

BACKGROUND OF THE INVENTION

1. Field of the Invention

The invention relates to mechanical fasteners. More particularly, the invention relates to mechanical fasteners suitable for suspending fixtures such as acoustic tile ceilings, pipes, lighting fixtures, electrical cables, HVAC equipment etc.

2. State of the Art

Current practice in the construction trade and building industry is to suspend fixtures with wires which are fastened to a wall or ceiling. An example of a state of the art apparatus for suspending fixtures is illustrated in prior art FIG. 54. The apparatus generally includes an angle bracket 10 having two holes 12, 14, a fastener 16 (typically a nail or a screw), and a length of wire 18 (often six to eight feet long). The method for using the apparatus includes attaching the wire 18 through one of the holes 14, inserting the fastener 16 through the other hole 12, and fastening the fastener 16 to a wall or ceiling 20. An exemplary bracket and fastener are illustrated in U.S. Pat. No. 5,178,503 and U.S. Pat. No. 4,736,923.

The apparatus shown in FIG. 54 is often used to suspend fixtures from cement, stone, or other masonry material ceilings, typically in commercial buildings. The wires 18 are attached to ceiling tile grids, pipe brackets, HVAC ducts, lighting fixtures, etc. Because a relatively large variety of equipment is hidden above a suspended acoustic tile ceiling in a commercial building, the wires 18 are often six to eight feet long.

The fastener 16 is usually pre-fit into the hole 12 of the bracket 10 during manufacture. However, the wire 18 (usually 12 gauge galvanized steel) must be manually attached to the bracket 10 by inserting a free end of the wire through the hole 14, looping the wire onto itself and twisting it as shown in FIG. 54. This is often done by hand with a pair of pliers or may be done with the aid of a hand operated (or drill operated) crank such as the "wire tying fixture", item number 00052075, sold by Hilti, Inc., Tulsa, Okla. These methods of attaching the wire to the bracket present several disadvantages.

The most apparent disadvantage is the cost of labor for the labor intensive task of twisting the wire. In order to be reasonably secure and satisfy some municipal codes, approximately eight inches of the wire must be twisted eight to ten turns about itself. In practice, many workers only twist the wire three or four times about itself. Still, the work is time consuming. The best productivity is not much more than about 300 pieces per hour and after about 500 pieces the worker needs to rest.

Another disadvantage is that this method of connecting the wire to the bracket is not very secure. Under a stress of about 50 lbs., the wire loop stretches and under a stress of about 210 lbs. the wire untwists.

Still another disadvantage is that the connection between the wire and the bracket is loose. Under normal circumstances, gravity provides tension between the wire and the bracket. However, in the case of an earthquake or a fire, the loose connection between the wire and the bracket allows vibration and movement of the fixtures supported by the wire. This can result in fixtures falling onto emergency workers and other similar hazards.

Yet another disadvantage is that if the bracket becomes damaged, the wire attached to it is usually wasted. For example, many brackets are manufactured with fasteners pre-attached so that the bracket may be installed quickly without holding both the bracket and fastener in place. If the fastener detaches from the bracket after the wire is attached but before the bracket is installed, or if the fastener fails to fasten properly, the bracket with the attached wire is typically discarded, thus wasting the wire.

It is estimated that the annual sale of brackets and wires is in excess of one hundred million. It is also estimated that the failur rate is 12–20%. The average wire length is six feet. Thus, approximately 72–120 million feet of wire goes to waste.

My prior application, referenced above, discloses an angle bracket with a hole for a fastener and a flange for coupling a wire to the angle bracket. The flange is lanced and it is coupled to the wire by crimping. According to a first embodiment, the flange is provided with two horizontal lances. According to a second embodiment, the flange is provided with at least three alternating horizontal lances. According to a third embodiment, the flange is provided with a horizontal lance and a vertical lance. According to a fourth embodiment, the flange is provided with a vertical lance in the shape of a hook and an eyelet is provided for connecting the wire. According to a fifth embodiment, the flange is wrapped to form a slotted cylinder. The wire is inserted into the slotted cylinder which is then compressed and crimped onto the wire. According to a sixth embodiment, the angle bracket is provided with two wire connecting flanges. A seventh embodiment is similar to the sixth embodiment with features of the second embodiment. A kit is also disclosed which includes a plurality of lanced angle brackets, a plurality of pre-cut lengths of wire, and a combined crimping and testing tool.

Although the methods and apparatus disclosed in my prior application are improvements over the prior art, they still have one disadvantage. After the wire is crimped to the bracket, it cannot be removed without cutting.

SUMMARY OF THE INVENTION

It is therefore an object of the invention to provide improved methods and apparatus for suspending fixtures.

It is also an object of the invention to provide methods and apparatus for suspending fixtures which are not labor intensive.

It is another object of the invention to provide methods and apparatus for suspending fixtures which are more economical than the state of the art.

It is still another object of the invention to provide methods and apparatus for suspending fixtures which are safer and stronger than the state of the art.

It is yet another object of the invention to provide methods and apparatus for suspending fixtures which provide brackets and wires which are easily coupled and uncoupled.

In accord with these objects which will be discussed in detail below, the apparatus of the present invention includes an angle bracket with a hole for a fastener and a flange with a hole for coupling a wire to the angle bracket. The flange is arranged to be substantially perpendicular to the axis of the fastener and substantially perpendicular to the axis of the wire. Six embodiments of a bracket according to the invention are disclosed. According to the invention a wire is provided with a deformation or attachment at one end which prevents it from passing completely through the hole in the flange of the bracket. Eight embodiments of a wire according to the invention are disclosed. The wires of the invention may be used with prior art brackets with little or no modification to the bracket. An unmodified prior art bracket is shown in conjunction with wires according to the invention and a slightly modified prior art bracket is shown with a wire according to the invention.

Additional objects and advantages of the invention will become apparent to those skilled in the art upon reference to the detailed description taken in conjunction with the provided figures.

BRIEF DESCRIPTION OF THE DRAWINGS

FIG. 26 is a side elevational view of a first combination of a bracket and a wire according to the invention;

FIG. 27 is a side elevational view of a second combination of a bracket and a wire according to the invention;

FIG. 28 is a side elevational view of a third combination of a bracket and a wire according to the invention;

FIG. 29 is a side elevational view of a fourth combination of a bracket and a wire according to the invention;

DETAILED DESCRIPTION OF THE PREFERRED EMBODIMENTS

Figure 1:
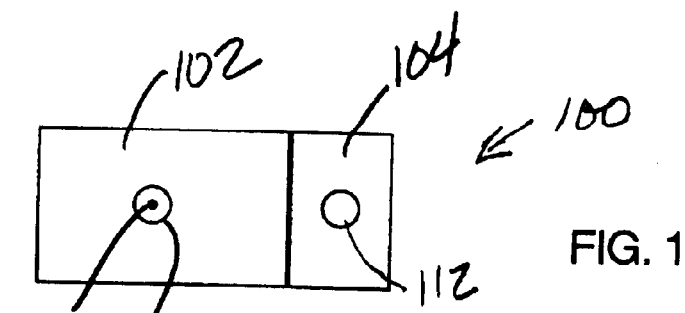
FIG. 1 is a top plan view of a first embodiment of a bracket according to the invention.
Figure 2:
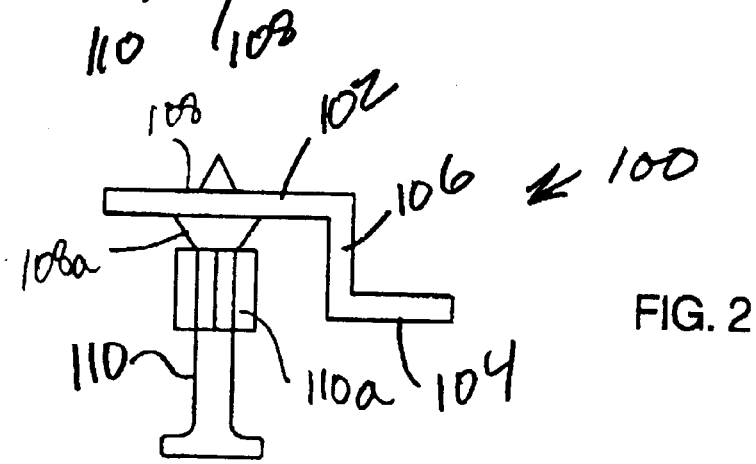
FIG. 2 is a side elevational view of the first embodiment of a bracket according to the invention.

Referring now to FIGS. 1 and 2, a first embodiment of a bracket 100 according to the invention includes a first flange 102, a second flange 104 and a connecting member 106. The first flange 102 is provided with a first hole 108 for receiving a fastener such as a nail 110. The second flange 104 is provided with a second hole 112 which is dimensioned to receive an appropriate wire as described in more detail below. As seen best in FIG. 2, the first flange 102 is provided with a depending frustrum 108*a* substantially concentric with the hole 108 for retaining the nail 110. In addition, the nail 110 is provided with a plastic collar 110*a* which facilitates the use of a power actuated nail gun as described in U.S. Pat. No. 5,417,534. Also as seen best in FIG. 2, according to this embodiment, the first flange 102 and the second flange 104 are substantially parallel to each other and the connecting member 106 is substantially perpendicular to both the first and second flanges. Those skilled in the art will appreciate that the flanges 102, 104 and connecting member 106 are preferably manufactured as a single member by stamping and power pressing.

Figure 3:
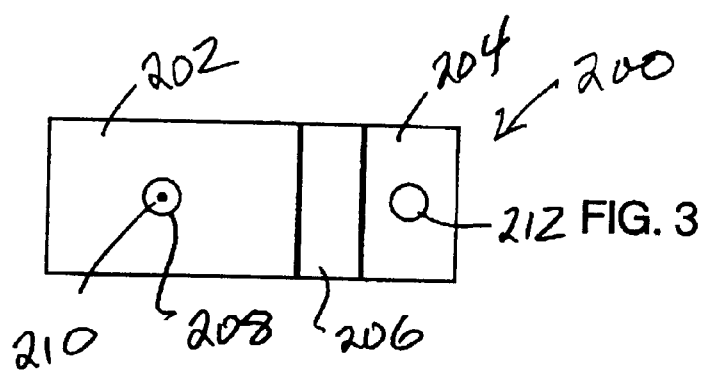
FIG. 3 is a top plan view of a second embodiment of a bracket according to the invention.
Figure 4:
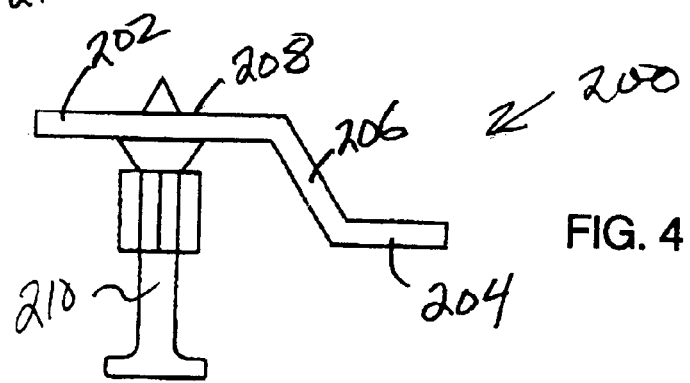
FIG. 4 is a side elevational view of the second embodiment of a bracket according to the invention.

FIGS. 3 and 4 illustrate a second embodiment of a bracket 200 according to the invention. The bracket 200 includes a first flange 202, a second flange 204 and a connecting member 206. The first flange 202 is provided with a first hole 208 for receiving a fastener such as a nail 210. The second flange 204 is provided with a second hole 212 which is dimensioned to receive an appropriate wire as described in more detail below. According to this embodiment, the first flange 202 and the second flange 204 are substantially parallel to each other and the connecting member 206 forms an obtuse angle with both the first and second flanges.

Figure 5:
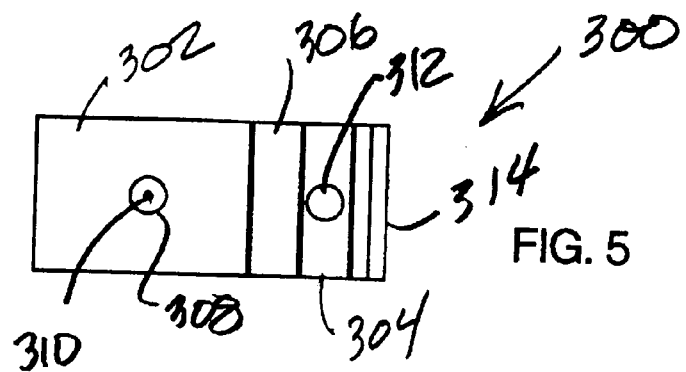
FIG. 5 is a top plan view of a third embodiment of a bracket according to the invention.
Figure 6:
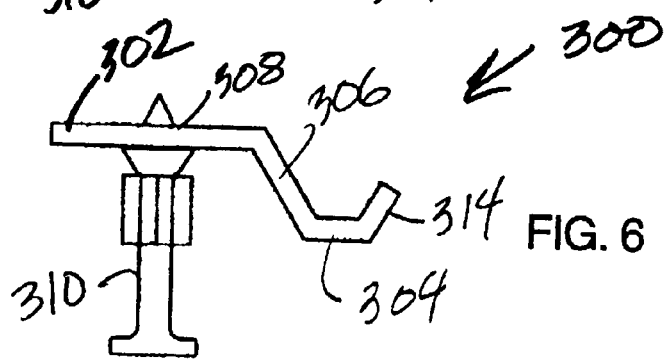
FIG. 6 is a side elevational view of the third embodiment of a bracket according to the invention.

Referring now to FIGS. 5 and 6, a third embodiment of a bracket 300 according to the invention includes a first flange 302, a second flange 304 and a connecting member 306. The first flange 302 is provided with a first hole 308 for receiving a fastener such as a nail 310. The second flange 304 is provided with a second hole 312 which is dimensioned to receive an appropriate wire as described in more detail below. According to this embodiment, the first flange 302 and the second flange 304 are substantially parallel to each other and the connecting member 306 forms an obtuse angle with both the first and second flanges. Also according to this embodiment, a lip 314 is provided on the free end of the flange 304.

Figure 7:
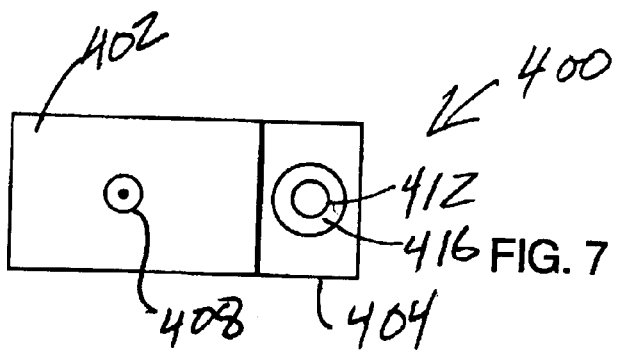
FIG. 7 is a top plan view of a fourth embodiment of a bracket according to the invention.
Figure 8:
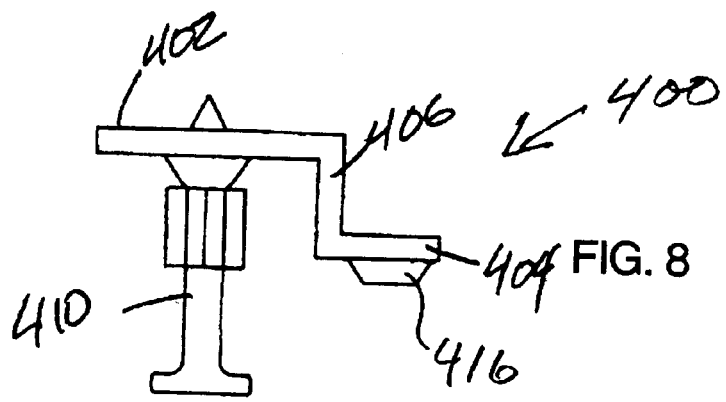
FIG. 8 is a side elevational view of the fourth embodiment of a bracket according to the invention.

A fourth embodiment of a bracket 400 according to the invention is shown in FIGS. 7 and 8. The bracket 400 is substantially the same as the bracket 100 (with similar reference numerals referring to similar features) but for the inclusion of a bowl-like structure 416 depending from the flange 404 substantially concentric with the hole 412. As will be described in more detail below, this bowl-like structure forms the socket portion of a ball and socket engagement with some embodiments of a wire according to the invention.

Figure 9:
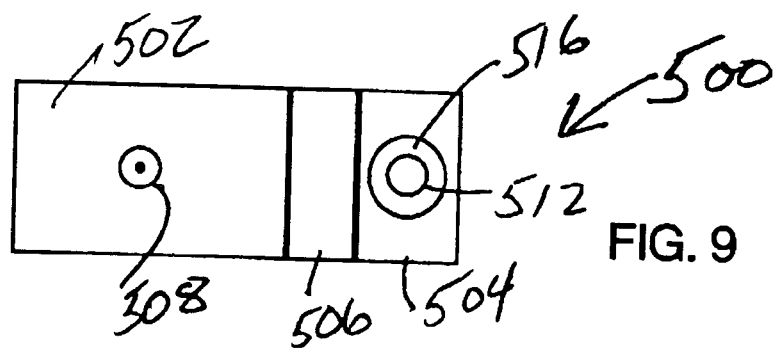
FIG. 9 is a top plan view of a fifth embodiment of a bracket according to the invention.
Figure 10:
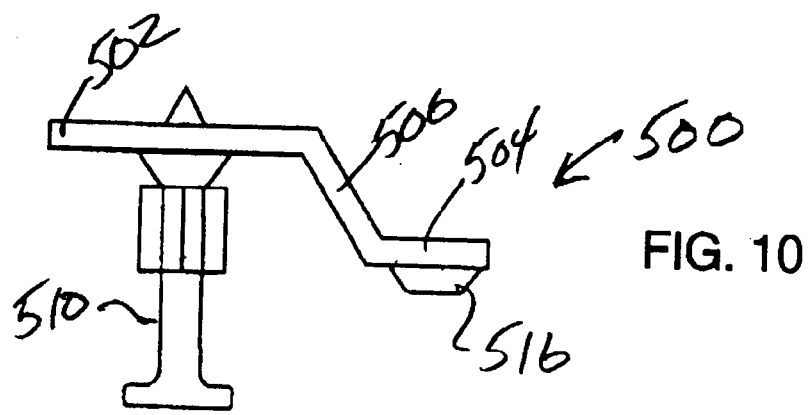
FIG. 10 is a side elevational view of the fifth embodiment of a bracket according to the invention.

A fifth embodiment of a bracket 500 according to the invention is shown in FIGS. 9 and 10. The bracket 500 is substantially the same as the bracket 200 (with similar reference numerals referring to similar features) but for the inclusion of a bowl-like structure 516 depending from the flange 504 substantially concentric with the hole 512. As will be described in more detail below, this bowl-like structure forms the socket portion of a ball and socket engagement with some embodiments of a wire according to the invention.

Figure 11:
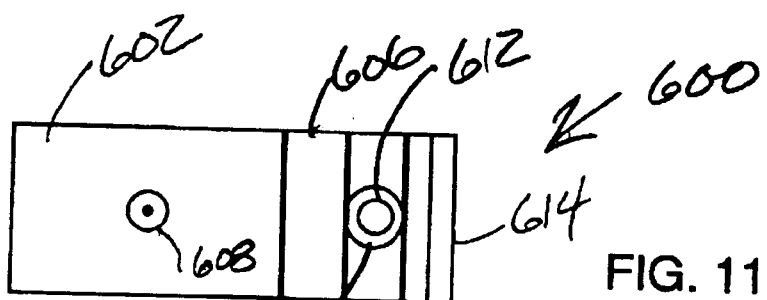
FIG. 11 is a top plan view of a sixth embodiment of a bracket according to the invention.
Figure 12:
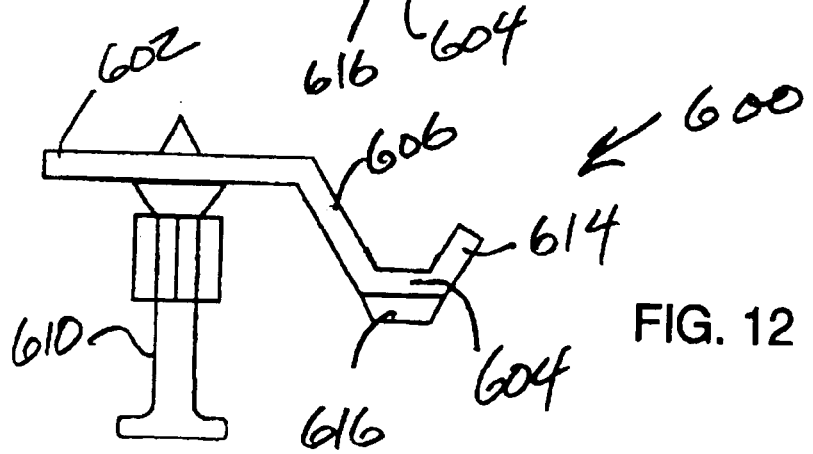
FIG. 12 is a side elevational view of the sixth embodiment of a bracket according to the invention.

A sixth embodiment of a bracket 600 according to the invention is shown in FIGS. 11 and 12. The bracket 600 is substantially the same as the bracket 300 (with similar reference numerals referring to similar features) but for the inclusion of a bowl-like structure 616 depending from the flange 604 substantially concentric with the hole 612. As will be described in more detail below, this bowl-like structure forms the socket portion of a ball and socket engagement with some embodiments of a wire according to the invention.

Figure 13:
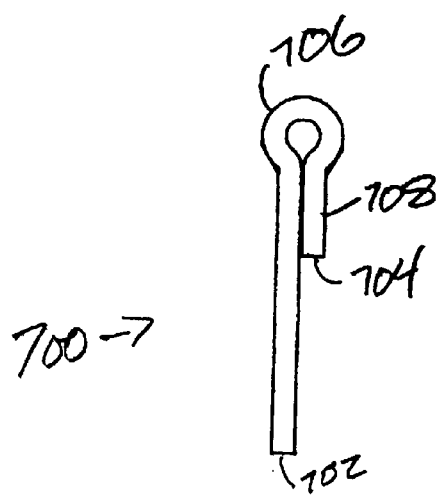
FIG. 13 is a side elevational view of a first embodiment of a wire according to the invention.
Figure 14:
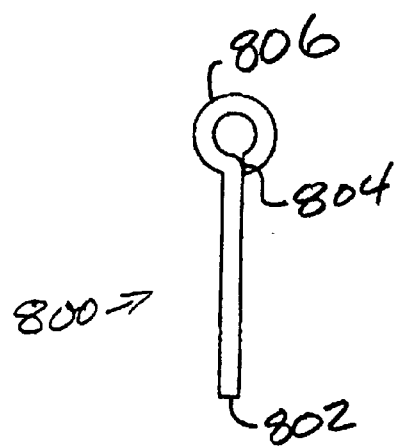
FIG. 14 is a side elevational view of a second embodiment of a wire according to the invention.

FIGS. 13–25 illustrate different embodiments of a wire suitable for use with the brackets described above or with prior art brackets as described below. A first embodiment of a wire 700, shown in FIG. 13, has a first end 702 and a second end 704. A portion 706 of the wire is bent into a loop leaving a straight portion 708 between the loop and the second end 704. The second embodiment 800 is similar to the first embodiment except that the loop 806 between the first end 802 and the second end 804 includes the second end 804.

Figure 15:
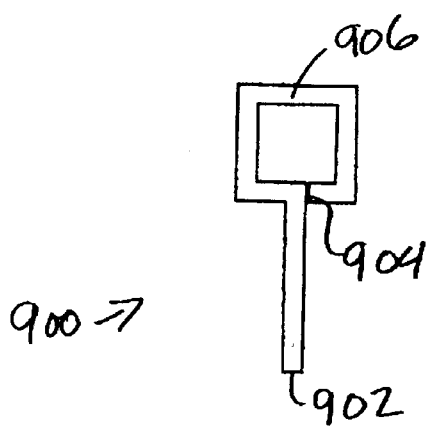
FIG. 15 is a side elevational view of a third embodiment of a wire according to the invention.
Figure 16:
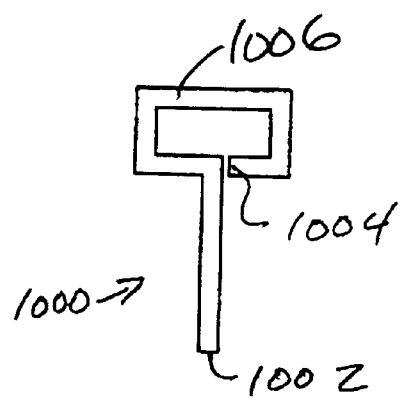
FIG. 16 is a side elevational view of a fourth embodiment of a wire according to the invention.

FIGS. 15 and 16 illustrate third and fourth embodiments of a wire 900 and 1000 which are similar to the second embodiment 800 (with similar reference numerals referring to similar features) except that the loop 906 is square and the loop 1006 is rectangular.

Figure 17:
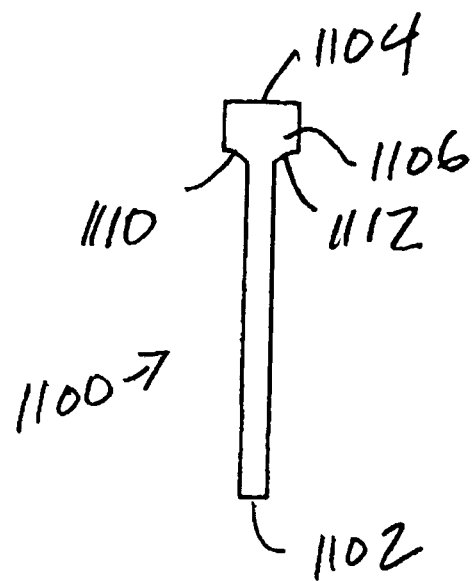
FIG. 17 is a side elevational view of a fifth embodiment of a wire according to the invention.
Figure 18:
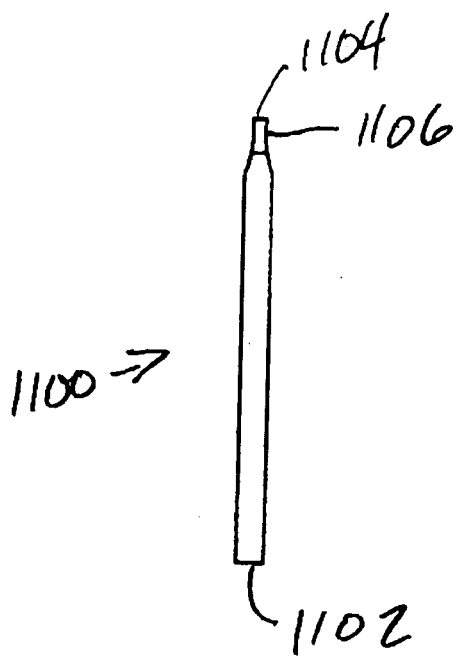
FIG. 18 is a side elevational view of the fifth embodiment of a wire according to the invention rotated 90° from the view of FIG. 17.
Figure 19:
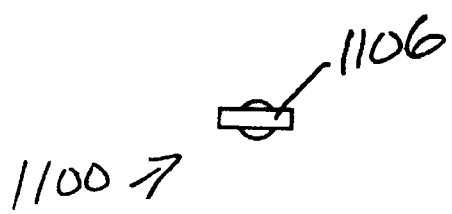
FIG. 19 is a top plan view of the fifth embodiment of a wire according to the invention.

FIGS. 17 through 19 illustrate a fifth embodiment of a wire 1100 according to the invention. The wire 1100 has a first end 1102 and a second end 1104. A portion 1106 adjacent to the second end 1104 is deformed by flattening forming a pair of shoulders 1110, 1112 as seen best in FIG. 17.

Figures 20, 21, 22, 23, 24, 25:
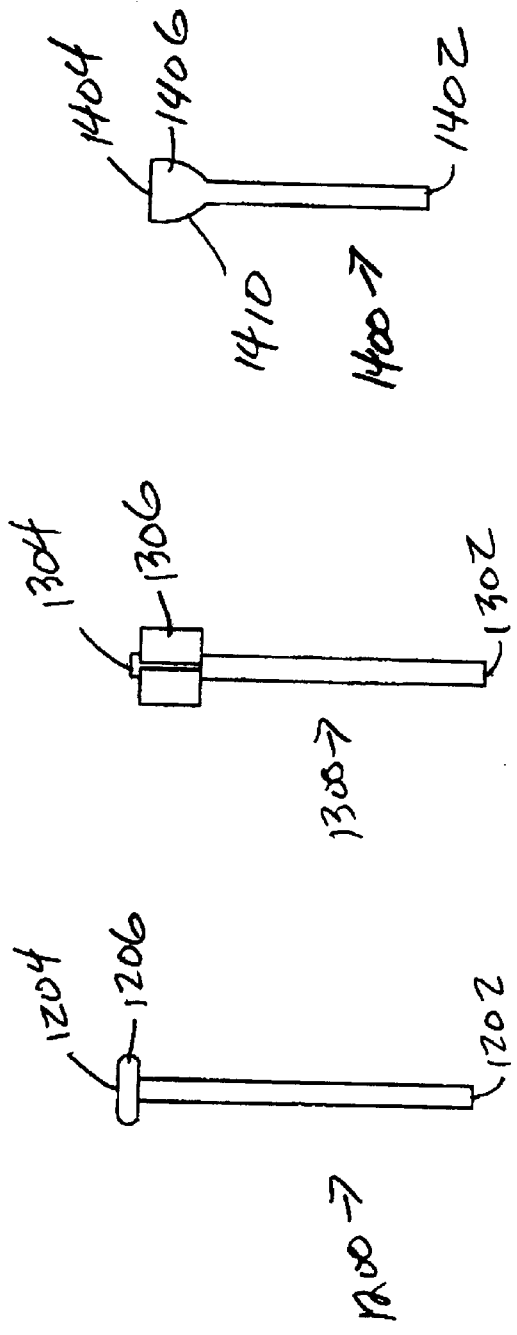
FIG. 20 is a side elevational view of a sixth embodiment of a wire according to the invention.
FIG. 21 is a bottom plan view of the sixth embodiment of a wire according to the invention.
FIG. 22 is a side elevational view of a seventh embodiment of a wire according to the invention.
FIG. 23 is a bottom plan view of the seventh embodiment of a wire according to the invention.
FIG. 24 is a side elevational view of an eighth embodiment of a wire according to the invention.
FIG. 25 is a bottom plan view of the eighth embodiment of a wire according to the invention.

FIGS. 20 and 21 illustrate a sixth embodiment of a wire 1200 according to the invention. The wire 1200 has a first end 1202 and a second end 1204. According to this embodiment, the second end 1204 is deformed with a heading machine to form a nail head 1206.

A seventh embodiment of a wire 1300 is illustrated in FIGS. 22 and 23. The wire 1300 has a first end 1302 and a second end 1304. According to this embodiment, a collar 1306 is crimped onto the wire adjacent to the second end 1304.

The eighth embodiment of a wire 1400 shown in FIGS. 24 and 25 has a first end 1402 and a second end 1404. According to this embodiment, a portion 1406 adjacent to the second end 1404 is deformed to form a conical or ellipsoidal surface 1410.

Figure 30:
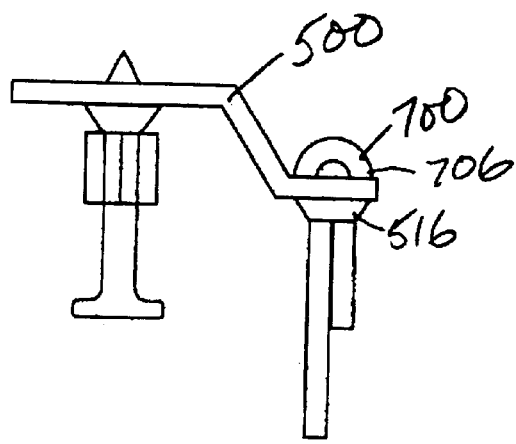
FIG. 30 is a side elevational view of a fifth combination of a bracket and a wire according to the invention.
Figure 31:
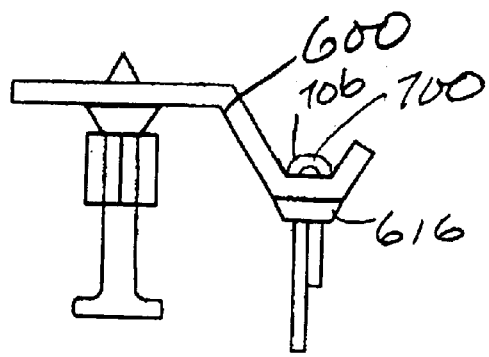
FIG. 31 is a side elevational view of a sixth combination of a bracket and a wire according to the invention.
Figure 32:
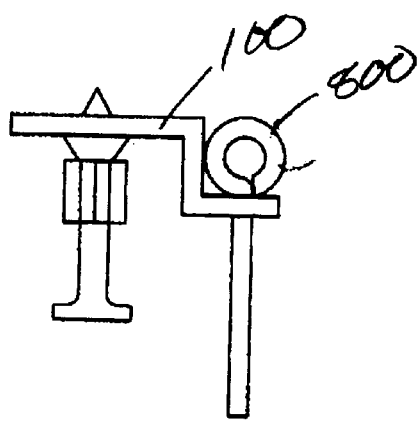
FIG. 32 is a side elevational view of a seventh combination of a bracket and a wire according to the invention.
Figure 33:
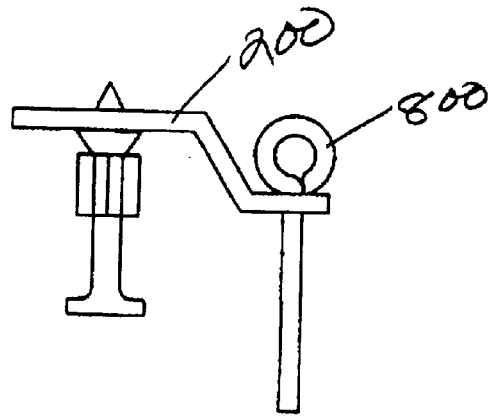
FIG. 33 is a side elevational view of an eighth combination of a bracket and a wire according to the invention.
Figure 34:
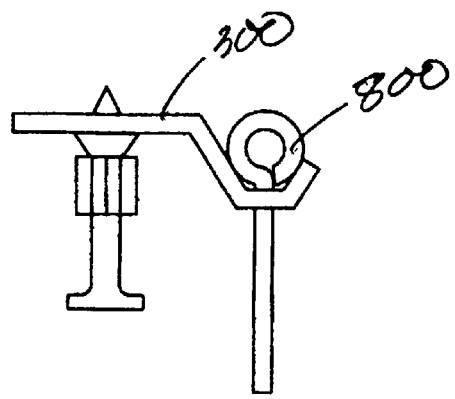
FIG. 34 is a side elevational view of a ninth combination of a bracket and a wire according to the invention.

FIGS. 26–48 illustrate combinations of brackets and wires according to the invention. FIGS. 26–31 illustrate the first embodiment of the wire 700 in conjunction with each of the six brackets. It will be appreciated that the loop 706 in the wire prevents it from passing completely through the hole in the second flange of the brackets. As seen in FIGS. 29–31, the curvature of the loop 706 rests on the interior curved surfaces of the bowls 416, 516, 616 forming a ball joint like coupling.

Figure 35:
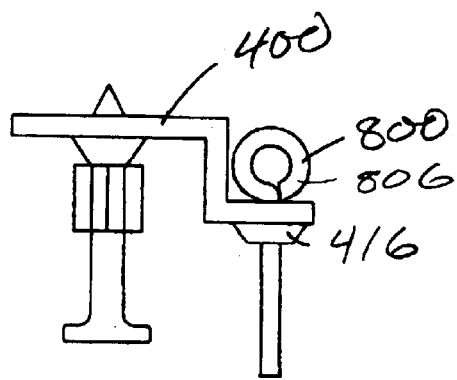
FIG. 35 is a side elevational view of a tenth combination of a bracket and a wire according to the invention.
Figure 36:
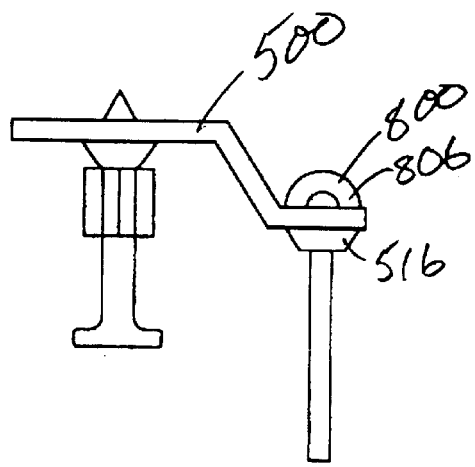
FIG. 36 is a side elevational view of an eleventh combination of a bracket and a wire according to the invention.
Figure 37:
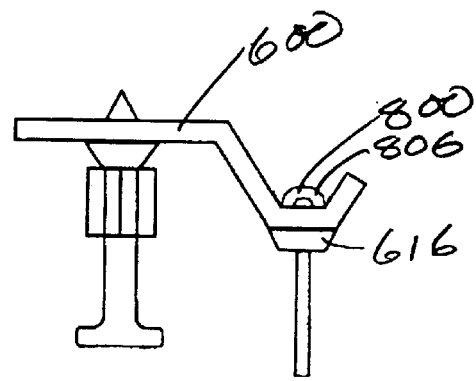
FIG. 37 is a side elevational view of a twelfth combination of a bracket and a wire according to the invention.

FIGS. 32–37 illustrate the second embodiment of the wire 800 in conjunction with each of the six brackets. It will be appreciated that the loop 806 in the wire prevents it from passing completely through the hole in the second flange of the brackets. As seen in FIGS. 35–37, the curvature of the loop 806 rests on the interior curved surfaces of the bowls 416, 516, 616 forming a ball joint like coupling.

Figure 38:
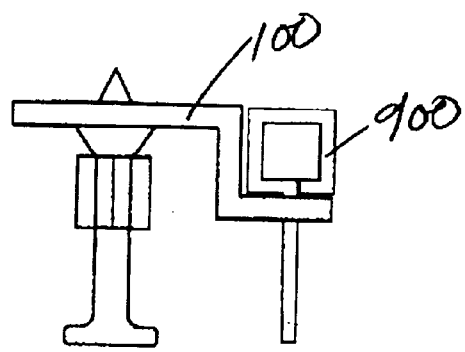
FIG. 38 is a side elevational view of a thirteenth combination of a bracket and a wire according to the invention.
Figure 39:
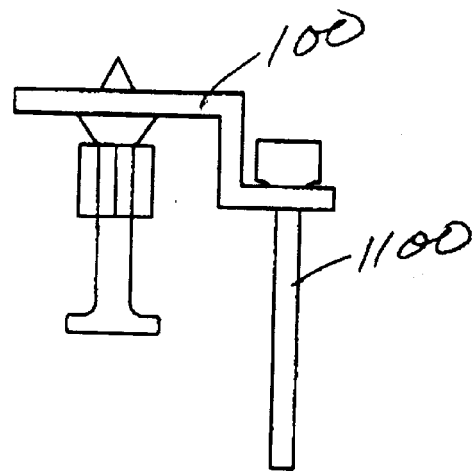
FIG. 39 is a side elevational view of a fourteenth combination of a bracket and a wire according to the invention.
Figure 40:
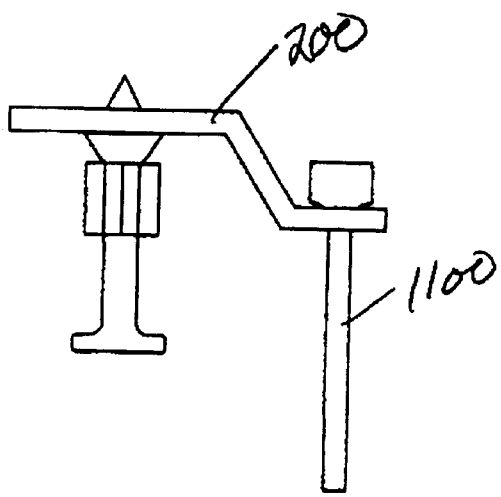
FIG. 40 is a side elevational view of a fifteenth combination of a bracket and a wire according to the invention.
Figure 41:
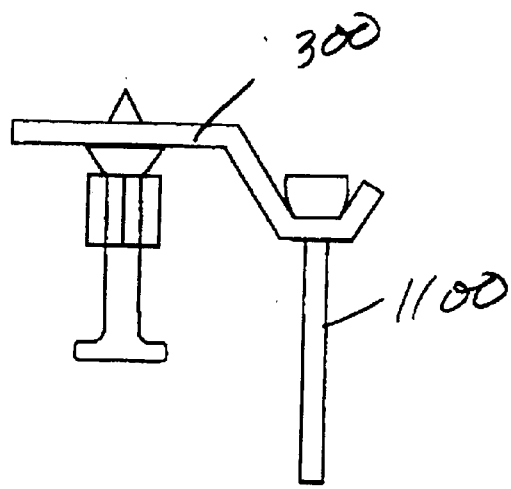
FIG. 41 is a side elevational view of a sixteenth combination of a bracket and a wire according to the invention.
Figure 42:
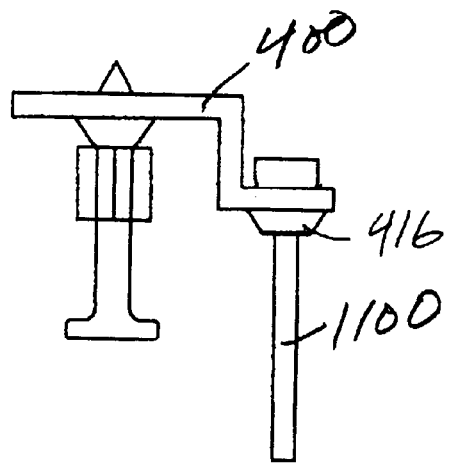
FIG. 42 is a side elevational view of a seventeenth combination of a bracket and a wire according to the invention.
Figure 43:
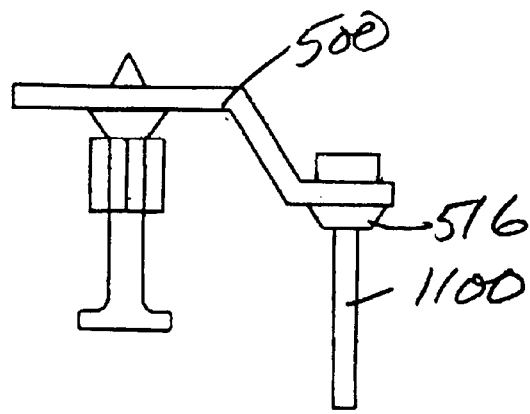
FIG. 43 is a side elevational view of an eighteenth combination of a bracket and A wire according to the invention.
Figure 44:
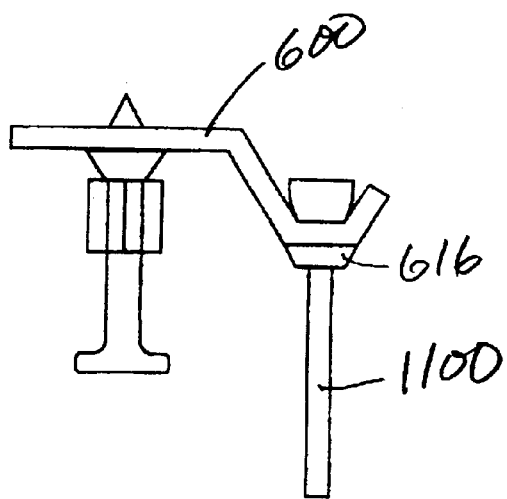
FIG. 44 is a side elevational view of a nineteenth combination of a bracket and a wire according to the invention.

FIG. 38 illustrates the third embodiment of the wire 900 in conjunction with the bracket 100. Although the wire 900 can be used with any of the brackets, it will be appreciated that it will not take advantage of the brackets with the depending bowl portions. It will also be appreciated that the fourth embodiment of the wire 1000 (FIG. 16) will behave similarly.

FIGS. 39–44 illustrate the fifth embodiment of the wire 1100 in conjunction with each of the six brackets. It will be appreciated that drawings of the eighth embodiment of the wire 1400 would be substantially the same as FIGS. 39–44. As seen in FIGS. 39–44, the shoulders (1110, 1112 in FIG. 17) or the surface (1410 in FIG. 24) prevents the wire from passing through the hole in the second flange. In the brackets having bowls 416, 516, 616, the shoulders (or surface) on the deformed end of the wire 1100 (1400) may engages the bowl in ball joint like manner.

Figure 45:
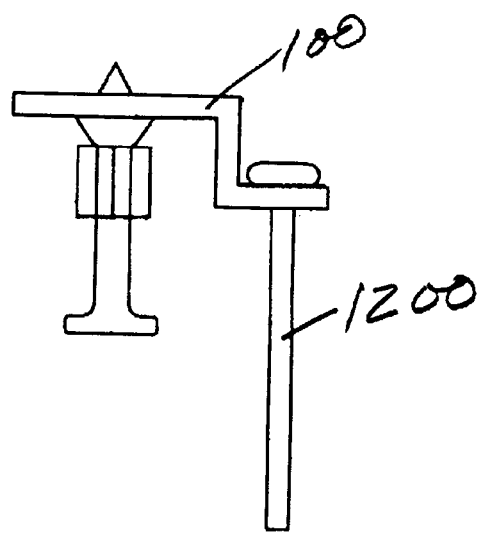
FIG. 45 is a side elevational view of a twentieth combination of a bracket and a wire according to the invention.
Figure 46:
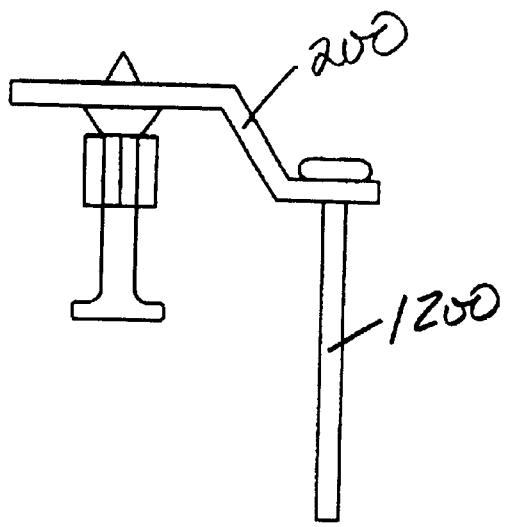
FIG. 46 is a side elevational view of a twenty-first combination of a bracket and a wire according to the invention.

FIGS. 45 and 46 illustrate the sixth embodiment of the wire 1200 in conjunction with the first and second embodiment of brackets 100, 200. Although the wire 1200 can be used with any of the brackets, it will be appreciated that it will not take advantage of the brackets with the depending bowl portions.

Figure 47:
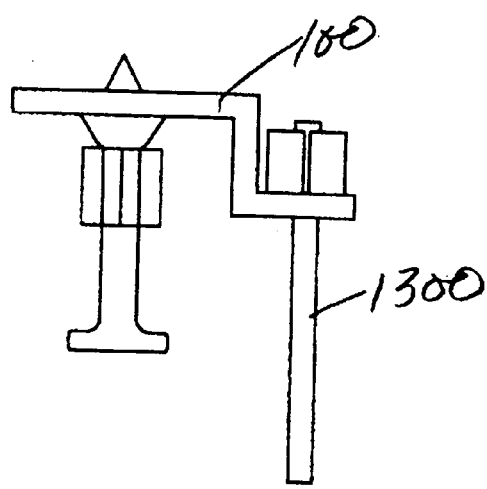
FIG. 47 is a side elevational view of a twenty-second combination of a bracket and a wire according to the invention.
Figure 48:
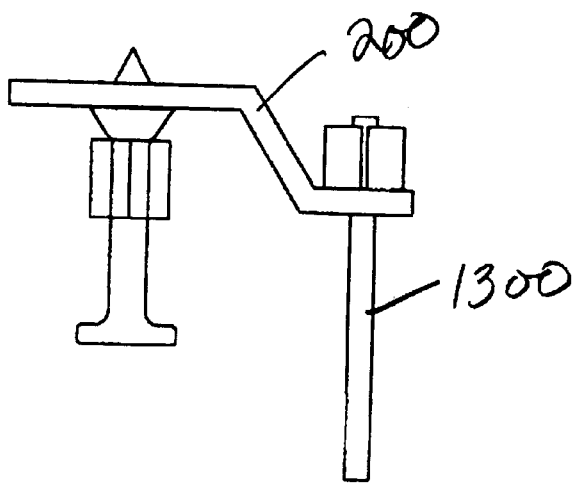
FIG. 48 is a side elevational view of a twenty-third combination of a bracket and a wire according to the invention.
Figure 49:
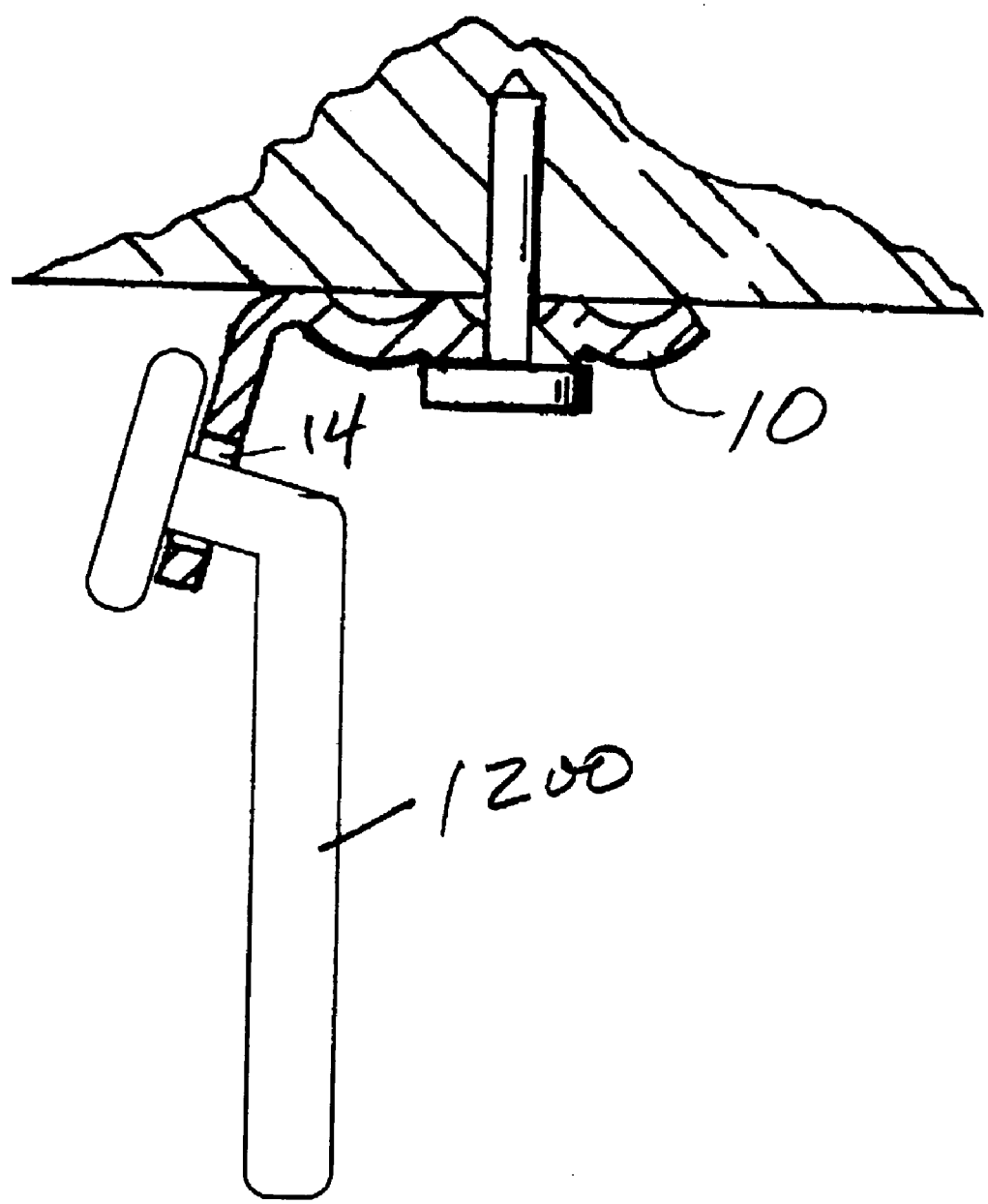
FIG. 49 is a side elevational view in partial section of a first combination of a prior art bracket and a wire according to the invention.
Figure 50:
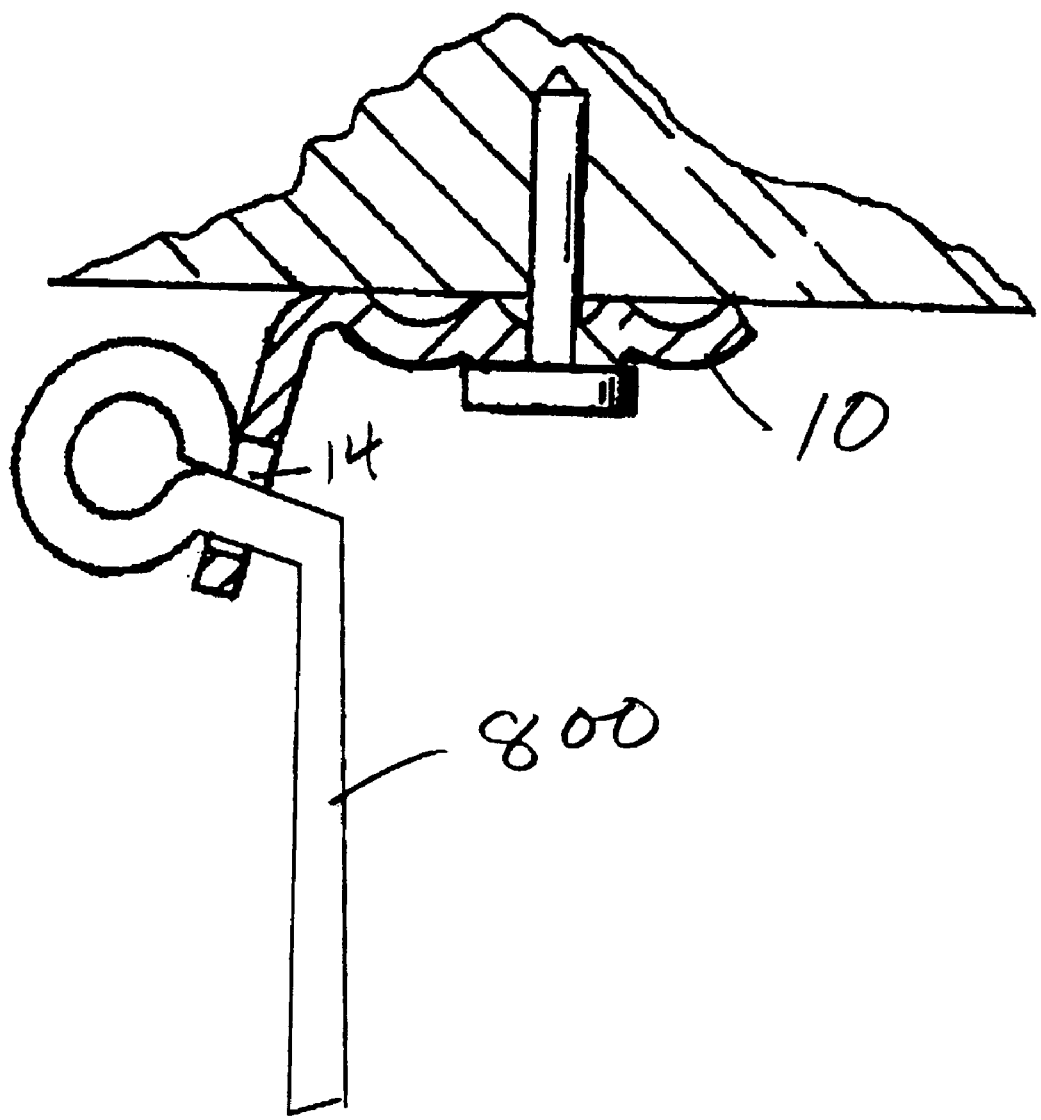
FIG. 50 is a side elevational view in partial section of a second combination of a prior art bracket and a wire according to the invention.
Figure 52:
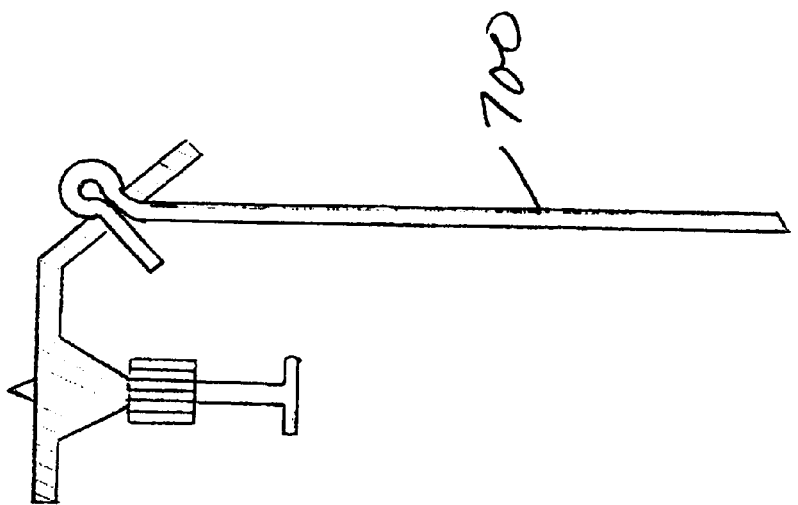
FIG. 52 is a side elevational view in partial section of a fourth combination of a prior art bracket and a wire according to the invention.

FIGS. 47 and 48 illustrate the seventh embodiment of the wire 1300 in conjunction with the first and second embodiment of brackets 100, 200. Although the wire 1300 can be used with any of the brackets, it will be appreciated that it will not take advantage of the brackets with the depending bowl portions.

FIGS. 49 through 52 illustrate how wires according to the invention can be used with prior art brackets subject only to proper dimensioning.

Figure 51:
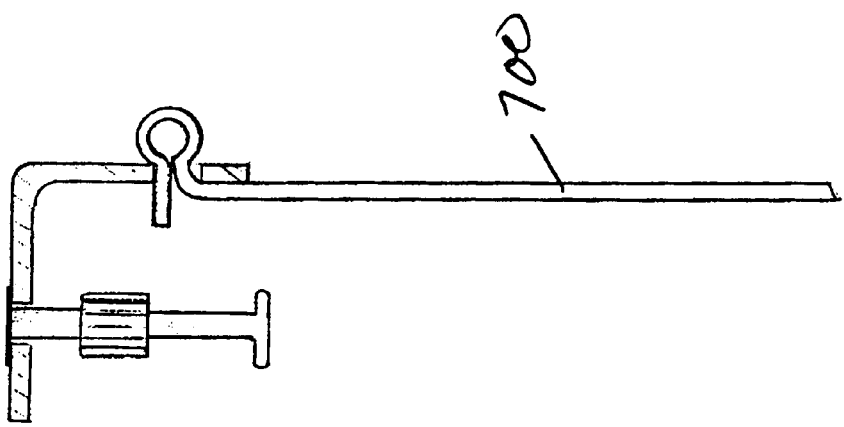
FIG. 51 is a side elevational view in partial section of a third combination of a prior art bracket and a wire according to the invention.
Figure 53:
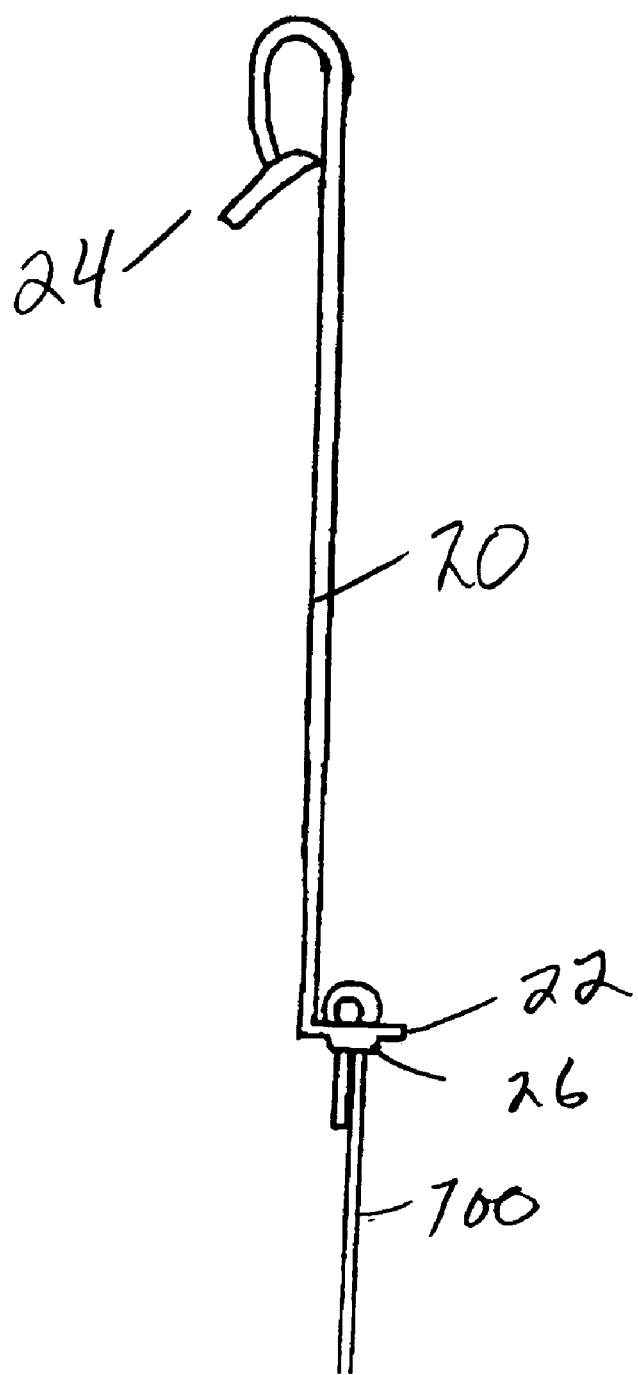
FIG. 53 is a side elevational view of a modified prior art bracket with a wire according to the invention.
Figure 54:
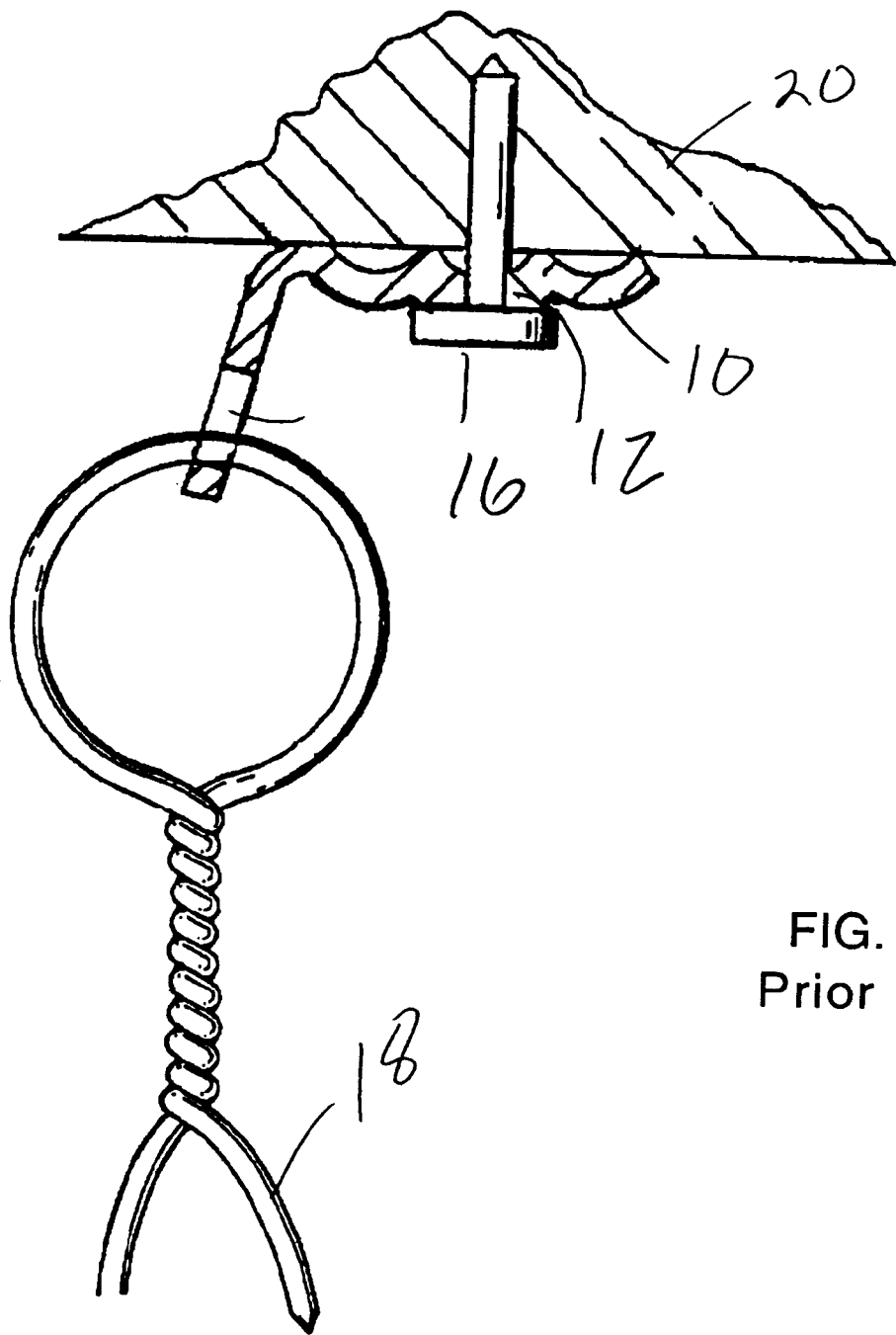
FIG. 54 is a schematic side elevational view, in partial section, of a state of the art apparatus for suspending fixtures.

FIG. 53 illustrates a modified prior art bracket 20 in conjunction with a wire according to the invention. The bracket 20 shown in FIG. 51 is a modified Ladd clip having a first end 22 and a second end 24. The second end 24 is formed as a hook in the prior art. The first 22 is modified according to the invention by bending it and forming a hole with a depending bowl like portion 26. The modified Ladd clip can be used with any of the wires of the invention and takes advantage of the ball joint like coupling described above.

The methods of the invention include providing an angle bracket having a first flange defining a hole for receiving a fastener and a second flange defining a hole for receiving a wire, obtaining a length of wire, deforming one end of the wire so that it cannot pass through the hole in the second flange, and inserting the non-deformed end of the wire through the hole in the second flange. It will be appreciated that unlike all of the prior methods and apparatus for suspending fixtures, the assembly of the bracket and the wire requires almost no labor at the job site. The deformed end of the wire can be deformed in a factory so that the worker need not perform the deformation step of the method. It will also be appreciated that the wire can be easily removed from the bracket so that if the bracket or fastener fails, the wire can be used with another bracket.

There have been described and illustrated herein several embodiments of methods and apparatus for suspending fixtures. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. An apparatus for suspending a fixture in conjunction with a wire, said apparatus comprising:
    an angle bracket having a first flange and a second flange;
    said first flange defining a first hole adapted to receive a fastener,
    said second flange defining a second hole adapted to receive the wire,
    said first flange and said second flange being substantially parallel to each other, and a wire having a first end and a second end, said first end being dimensioned to fit through said second hole, said second end being dimensioned to not fit through said second hole.

2. An apparatus according to claim 1, further comprising:
    a connecting member coupling said first and second flanges.

3. An apparatus according to claim 2, wherein:
    said connecting member is substantially perpendicular to both of said flanges.

4. An apparatus according to claim 2, wherein:
    said connecting member forms an obtuse angle with said first flange.

5. An apparatus according to claim 1, wherein:
    said second flange has a free end with a lip extending from said free end.

6. An apparatus according to claim 1, wherein:
    said first end of said wire can be inserted through said second hole and said wire pulled through said second hole until said second end abuts said second flange adjacent to said second hole, and
    said wire can be removed from said second hole by pushing said first end or pulling said second end.

7. An apparatus according to claim 1, wherein:
    said second end of said wire is formed as a loop.

8. An apparatus according to claim 7, wherein:
    said loop is substantially circular.

9. An apparatus according to claim 1, wherein:
    said second end of said wire is flattened.

10. An apparatus according to claim 1, wherein:
    said second end of said wire is substantially flat defining a pair of shoulders.

11. An apparatus according to claim 1, wherein:
    said second end of said wire has a nail head configuration.

12. An apparatus according to claim 1, wherein:
    said second end of said wire has a collar.

13. An apparatus according to claim 1, wherein:
    said first end of said wire has a first diameter,
    said second end of said wire has a second diameter larger than said first diameter,
    said wire defines a surface of changing diameter adjacent to said second end.

14. An apparatus according to claim 13, wherein:
    said surface defines a smooth transition between said first and second diameters.

15. A method of suspending a fixture from a surface, comprising:
    obtaining a length of wire having a first and second end, the second end having an overall dimension larger than that of the first end, obtaining a fastener, obtaining an angle bracket having a first flange and a second flange, the first flange defining a first hole adapted to receive the fastener, the second flange having a second hole adapted to receive a first end of the wire but not allow the passage of the second end of the wire, inserting the first end of the wire into the second hole until the second end of the wire abuts the second flange, inserting the fastener into the first hole.

16. The method according to claim 15, further comprising:

fastening the fastener to the surface.

17. The method according to claim 16, further comprising:

attaching the fixture to the first end of the wire.

18. A wire for use with a bracket in suspending a fixture from a surface where the bracket has a first flange having a first hole for receiving a fastener and a second flange having a second hole for receiving the wire, said wire comprising:

a length of wire at least one foot long having a first end and a second end, said first end being dimensioned to fit through the second hole of the bracket and being adapted to be coupled to the fixture, said second end being dimensioned to not fit through the second hole and being adapted to engage a against the second flange under weight of the fixture, wherein said first end of said wire can be inserted through the second hole of the bracket and said wire pulled through the second hole of the bracket until said second end abuts the second flange adjacent to the second hole, and said wire can be removed from the second hole by pushing said first end or pulling said second end.

* * * * *